(12) United States Patent
Takeuchi et al.

(10) Patent No.: US 9,611,170 B2
(45) Date of Patent: Apr. 4, 2017

(54) CRYSTALLIZED GLASS AND METHOD FOR MANUFACTURING SAME

(71) Applicant: NIPPON ELECTRIC GLASS CO., LTD., Otsu-shi, Shiga (JP)

(72) Inventors: Hirokazu Takeuchi, Otsu (JP); Shuhei Ogawa, Otsu (JP); Nobuo Funabiki, Otsu (JP); Masahiro Kobayashi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/763,178

(22) PCT Filed: Jan. 9, 2014

(86) PCT No.: PCT/JP2014/050205
§ 371 (c)(1),
(2) Date: Jul. 24, 2015

(87) PCT Pub. No.: WO2014/129223
PCT Pub. Date: Aug. 28, 2014

(65) Prior Publication Data
US 2015/0376052 A1    Dec. 31, 2015

(30) Foreign Application Priority Data

Feb. 21, 2013   (JP) ................. 2013-031751

(51) Int. Cl.
*C03C 10/12*   (2006.01)
*C03C 10/00*   (2006.01)
(Continued)

(52) U.S. Cl.
CPC .......... *C03C 10/0027* (2013.01); *C03B 32/02* (2013.01); *G02B 1/02* (2013.01); *C03C 2204/00* (2013.01); *G02B 6/12007* (2013.01)

(58) Field of Classification Search
CPC .................................. C03C 10/0027
See application file for complete search history.

(56) References Cited

U.S. PATENT DOCUMENTS 6,387,509 B1    5/2002  Goto et al.
7,141,521 B2 *  11/2006 Siebers et al. .......... C03C 3/085
                                                            501/32
(Continued)

FOREIGN PATENT DOCUMENTS

CN    1237546 A       12/1999
JP    11-314939 A     11/1999
(Continued)

OTHER PUBLICATIONS

Official Communication issued in International Patent Application No. PCT/JP2014/050205, mailed on Apr. 15, 2014.
(Continued)

*Primary Examiner* — Karl Group
(74) *Attorney, Agent, or Firm* — Keating and Bennett, LLP

(57) ABSTRACT

What is achieved is an optical wavelength multiplexer/demultiplexer not necessarily requiring the function of adjusting the optical path. A value $(\Delta L_{max}-\Delta L_{min})/L$ obtained by dividing a difference between a maximum value $\Delta L_{max}$ and a minimum value $\Delta L_{min}$ of $\Delta L$ in a range of $-40°$ C. to $80°$ C. by L is $8\times10^{-6}$ or less where L represents a length of a crystallized glass (1) at 30° C. and $\Delta L$ represents a difference between a length ($L_t$) of the crystallized glass (1) at each of the temperatures and the length (L) thereof at 30° C.

4 Claims, 2 Drawing Sheets

(51) Int. Cl.
*G02B 1/02* (2006.01)
*C03B 32/02* (2006.01)
*G02B 6/12* (2006.01)

(56) References Cited

U.S. PATENT DOCUMENTS

| | | | |
|---|---|---|---|
| 7,285,506 B2* | 10/2007 | Horsfall | C03C 3/085 |
| | | | 501/4 |
| 7,943,539 B2* | 5/2011 | Minamikawa | C03C 10/0027 |
| | | | 501/4 |
| 8,257,831 B2* | 9/2012 | Yagi | C03C 3/083 |
| | | | 428/426 |
| 8,461,068 B2* | 6/2013 | Almoric | C03C 10/0027 |
| | | | 501/4 |
| 9,126,859 B2* | 9/2015 | Nakane et al. | C03C 3/097 |
| 2006/0084561 A1* | 4/2006 | Horsfall | C03C 3/085 |
| | | | 501/7 |
| 2006/0160689 A1 | 7/2006 | Hsu et al. | |
| 2007/0105700 A1* | 5/2007 | Horsfall | C03C 3/085 |
| | | | 501/7 |
| 2009/0042710 A1 | 2/2009 | Minamikawa | |
| 2009/0286667 A1* | 11/2009 | Siebers et al. | C03C 1/002 |
| | | | 501/59 |
| 2013/0130887 A1* | 5/2013 | Nakane et al. | C03C 3/097 |
| | | | 501/32 |
| 2013/0288876 A1* | 10/2013 | Fujisawa et al. | C03C 10/0027 |
| | | | 501/32 |

FOREIGN PATENT DOCUMENTS

| | | | |
|---|---|---|---|
| JP | 2002154840 | * | 5/2002 |
| JP | 2006-008488 A | | 1/2006 |
| JP | 2006-199538 A | | 8/2006 |
| JP | 2006-284955 A | | 10/2006 |
| JP | 2009-527436 A | | 7/2009 |
| JP | 2010064900 | * | 3/2010 |
| JP | 2011157265 | * | 8/2011 |
| JP | 2012-056829 A | | 3/2012 |
| JP | 2013121890 | * | 6/2013 |
| WO | 2007/065910 A1 | | 6/2007 |
| WO | 2011/106489 A2 | | 9/2011 |
| WO | 2013171288 | * | 11/2013 |

OTHER PUBLICATIONS

Official Communication issued in corresponding European Patent Application No. 14754398.7, mailed on Oct. 5, 2016.

* cited by examiner

CRYSTALLIZED GLASS AND METHOD FOR MANUFACTURING SAME

TECHNICAL FIELD

The present invention relates to a crystallized glass and a method for manufacturing the same.

BACKGROUND ART

An optical communication system using dense wavelength division multiplex (DWDM) is conventionally used. An optical wavelength multiplexer/demultiplexer is used for DWDM. Patent Literature 1 describes an example thereof. The optical wavelength multiplexer/demultiplexer described in Patent Literature 1 is formed on a silicon substrate.

CITATION LIST

Patent Literature

[PTL 1]
JP-A-2006-284955

SUMMARY OF INVENTION

Technical Problem

What is important to the optical wavelength multiplexer/demultiplexer is the positional accuracy between optical elements provided therein. However, when the temperature of the optical wavelength multiplexer/demultiplexer changes, the relative positional relationship between the optical elements also changes. In view of this, it is conceivable to provide, upon change of the relative positional relationship between the optical elements, feedback to an optical path adjusting device formed of a MEMS (micro electro mechanical systems) mirror and so on to adjust the optical path or to make it possible to control the optical wavelength multiplexer/demultiplexer itself at a constant temperature. However, such methods as just described present the problem of increasing the size of the optical wavelength multiplexer/demultiplexer and the problem of complicating the control over the optical wavelength multiplexer/demultiplexer.

A principal object of the present invention is to achieve an optical wavelength multiplexer/demultiplexer not necessarily requiring the function of adjusting the optical path.

Solution to Problem

In a crystallized glass plate according to the present invention, a value $(\Delta L_{max} - \Delta L_{min})/L$ obtained by dividing a difference between a maximum value $\Delta L_{max}$ and a minimum value $\Delta L_{min}$ of $\Delta L$ in a range of $-40°$ C. to $80°$ C. by L is $8 \times 10^{-6}$ or less where L represents a length of the crystallized glass plate at $30°$ C. and $\Delta L$ represents a difference between a length $(L_t)$ of the crystallized glass plate at each of the temperatures and the length (L) thereof at $30°$ C.

In the crystallized glass plate according to the present invention, a local maximum point and a local minimum point of $\Delta L/L$ preferably exist in the range of $-40°$ C. to $80°$ C.

A method for manufacturing a crystallized glass according to the present invention includes the steps of preparing a crystallizable glass and crystallizing the crystallizable glass to obtain a crystallized glass. A maximum temperature in the crystallization step is a temperature according to a thermal expansion characteristic of the crystallized glass to be obtained.

In the method for manufacturing a crystallized glass according to the present invention, the maximum temperature in the crystallization step is preferably set so that a value $(\Delta L_{max} - \Delta L_{min})/L$ obtained by dividing a difference between a maximum value $\Delta L_{max}$ and a minimum value $\Delta_{min}$ of $\Delta L$ in a range of $-40°$ C. to $80°$ C. by L is $8 \times 10^{-6}$ or less where L represents a length of the crystallized glass at $30°$ C. and $\Delta L$ represents a difference between a length $(L_t)$ of the crystallized glass at each of the temperatures and the length (L) thereof at $30°$ C.

Advantageous Effects of Invention

The present invention can achieve an optical wavelength multiplexer/demultiplexer not necessarily requiring the function of adjusting the optical path.

DESCRIPTION OF EMBODIMENTS

Hereinafter, a description will be given of an example of a preferred embodiment for working of the present invention. However, the following embodiment is simply illustrative. The present invention is not at all limited to the following embodiment.

(Crystallized Glass 1)

Figure 1:
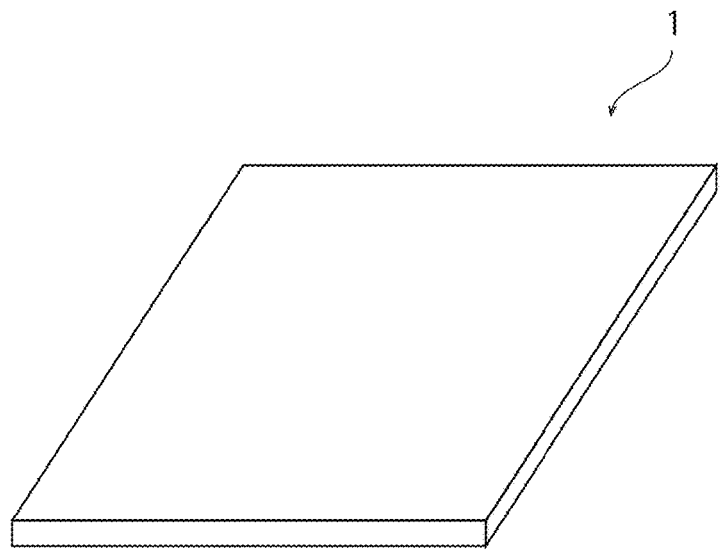
FIG. 1 is a schematic perspective view of a crystallized glass according to one embodiment of the present invention.

FIG. 1 is a crystallized glass 1 for use in an optical wavelength multiplexer/demultiplexer or the like. The crystallized glass 1 is preferably, for example, a plate-like body and a plate-like crystallized glass is produced by molding a molten glass into a plate and crystallizing the plate or by molding a molten glass into a block, crystallizing the block, cutting the block into a plate, and polishing the plate.

As described previously, what is important to an optical wavelength multiplexer/demultiplexer is to prevent that the relative positional relationship between optical elements changes with temperature change. It may be conceivable as a solution to this, for example, to use a glass plate having a small average coefficient of linear thermal expansion. However, the inventors have found, as a result of their intensive studies, that even with the use of a glass plate having a small average coefficient of linear thermal expansion, change in relative positional relationship between optical elements with temperature change may not be able to be sufficiently prevented. Also, the inventors have found that the reason for the above is that even when the average coefficient of linear thermal expansion is small, the amount of thermal expansion in a particular temperature range becomes large.

To cope with this, in the crystallized glass 1, the value $(\Delta L_{max} - \Delta L_{min})/L$ obtained by dividing the difference between the maximum value $\Delta L_{max}$ and the minimum value $\Delta L_{min}$ of $\Delta L$ in a range of $-40°$ C. to $80°$ C. by L is $8 \times 10^{-6}$ or less where L represents the length of the crystallized glass 1 at 30° C. and ΔL represents the difference between the length ($L_t$) thereof at each of the temperatures and the length (L) thereof at 30° C. Therefore, at each of −40° C. to 80° C. constituting a guaranteed temperature range of the optical wavelength multiplexer/demultiplexer, the amount of deformation upon temperature change of the crystallized glass 1 is small. Thus, with the use of the crystallized glass 1, the relative positional relationship between the optical elements is less likely to change even upon temperature change. Hence, the use of the crystallized glass 1 enables achievement of an optical wavelength multiplexer/demultiplexer not necessarily requiring the function of adjusting the optical path.

From the viewpoint of more effectively preventing change in relative positional relationship between optical elements with temperature change, $(\Delta L_{max}-\Delta L_{min})/L$ in the range of −40° C. to 80° C. is preferably $6\times10^{-6}$ or less, more preferably $5\times10^{-6}$ or less, still more preferably $3\times10^{-6}$ or less, most preferably $2\times10^{-6}$ or less.

For reference, $(\Delta L_{max}-\Delta L_{min})/L$ of silicon in the range of −40° C. to 80° C. is $300\times10^{-6}$. $(\Delta L_{max}-\Delta L_{min})/L$ of quartz glass in the range of −40° C. to 80° C. is $34\times10^{-6}$. $(\Delta L_{max}-\Delta L_{min})/L$ in the range of −40° C. to 80° C. of crystallized glass containing β-quartz solid solution as a predominant crystal phase (Neoceram N-0 manufactured by Nippon Electric Glass Co., Ltd.) is $24\times10^{-6}$. $(\Delta L_{max}-\Delta L_{min})/L$ in the range of −40° C. to 80° C. of crystallized glass containing β-spodumene solid solution as a predominant crystal phase (Neoceram N-11 manufactured by Nippon Electric Glass Co., Ltd.) is $62\times10^{-6}$.

The coefficient of thermal expansion of the crystallized glass containing β-quartz solid solution as a predominant crystal phase (Neoceram N-0 manufactured by Nippon Electric Glass Co., Ltd.) monotonically decreases with increasing temperature in the temperature range of −40° C. to 80° C. On the other hand, the coefficient of thermal expansion of the crystallized glass containing β-spodumene solid solution as a predominant crystal phase (Neoceram N-11 manufactured by Nippon Electric Glass Co., Ltd.) monotonically increases with increasing temperature in the temperature range of −40° C. to 80° C. Therefore, for the crystallized glass containing only one of 0-quartz solid solution and β-spodumene solid solution as a predominant crystal phase, it is difficult to reduce $(\Delta L_{max}-\Delta L_{min})/L$ in the range of −40° C. to 80° C. It can be believed that when crystallized glass contains both of β-quartz solid solution and β-spodumene solid solution as predominant crystal phases, $(\Delta L_{max}-\Delta L_{min})/L$ in the range of −40° C. to 80° C. of the crystallized glass can be sufficiently reduced. It can be believed that particularly when crystallized glass contains both of β-quartz solid solution and β-spodumene solid solution as predominant crystal phases in such a proportion that a local maximum point and a local minimum point of ΔL/L exist in the range of −40° C. and 80° C., $(\Delta L_{max}-\Delta L_{min})/L$ in the range of −40° C. to 80° C. of the crystallized glass can be further reduced.

(Method for Manufacturing Crystallized Glass 1)

The crystallized glass 1 can be manufactured in the following manner.

First, a crystallizable glass for forming the crystallized glass 1 is prepared. Next, the crystallizable glass is crystallized to obtain a crystallized glass 1 (crystallization step).

The crystallizable glass preferably has a composition that can precipitate both of β-quartz solid solution and β-spodumene solid solution. Specifically, the preferred composition of the crystallizable glass is, in % by mass, 55 to 75% $SiO_2$, 20.5 to 27% $Al_2O_3$, over 2 to 8% $Li_2O$, 1.5 to 3% $TiO_2$, 0.1 to 0.5% $SnO_2$, 3.8 to 5% $TiO_2+ZrO_2$, 3.7 to 4.5% $Li_2O+0.741MgO+0.367ZnO$, and up to 0.5% $SrO+1.847CaO$.

The inventors have found from their intensive studies that by changing the maximum temperature in the crystallization step, the coefficient of thermal expansion and $(\Delta L_{max}-\Delta L_{min})/L$ of the resultant crystallized glass 1 can be changed. In other words, the inventors have found that crystallized glasses 1 different in $(\Delta L_{max}-\Delta L_{min})/L$ can be obtained even from crystallizable glass of the same composition by changing the maximum temperature in the crystallization step. Thus, it has been found that it is sufficient to select the maximum temperature in the crystallization step according to the thermal expansion characteristic of the crystallized glass to be obtained. Therefore, in this embodiment, it is preferred to set the maximum temperature in the crystallization step so that $(\Delta L_{max}-\Delta L_{min})/L$ of the crystallized glass 1 in the range of −40° C. to 80° C. is preferably $8\times10^{-6}$ or less, more preferably $6\times10^{-6}$ or less, still more preferably $5\times10^{-6}$ or less, even more preferably $3\times10^{-6}$ or less, and most preferably $2\times10^{-6}$ or less. The maximum temperature in the crystallization step is preferably set to precipitate both of β-quartz solid solution and β-spodumene solid solution.

The reason why $(\Delta L_{max}-\Delta L_{min})/L$ of the resultant crystallized glass 1 can be changed by changing the maximum temperature in the crystallization step in the above manner is not clear but can be considered as follows. It can be considered that by changing the maximum temperature in the crystallization step, both of β-quartz solid solution and β-spodumene solid solution precipitate and the proportion of precipitation between both the types of solid solution changes, so that $(\Delta L_{max}-L_{min})/L$ changes.

In order to facilitate the precipitation of both of β-quartz solid solution and β-spodumene solid solution in the crystallization step, it is preferred that the rate of temperature rise from the maximum temperature minus 100° C. to the maximum temperature be 0.05° C./min to 5° C./min.

The present invention will be described below in more detail with reference to specific examples but the present invention is not at all limited by the following examples. Modifications and variations may be appropriately made therein without changing the gist of the present invention.

Example 1

A raw material batch was obtained by blending and mixing raw materials to give a composition of, in % by mass, 65.75% $SiO_2$, 22.3% $Al_2O_3$, 3.6% $Li_2O$, 0.7% MgO, 2.0% $TiO_2$, 2.2% $ZrO_2$, 1.4% $P_2O_5$, 0.35% $Na_2O$, 0.3% $K_2O$, 1.2% BaO, and 0.2% $SnO_2$. The raw material batch was melted at 1600° C. for 24 hours and then rolled into a plate to obtain a crystallizable glass plate.

Next, the obtained crystallizable glass plate was crystallized by subjecting it to a thermal treatment at a maximum temperature of 925° C., for 30 hours holding time at the maximum temperature, at a rate of temperature rise of 1° C./min, and at a rate of temperature drop of 1° C./min, thereby obtaining a crystallized glass plate. The size of the obtained crystallized glass plate was 300 mm by 300 mm by 5 mm.

Figure 2:
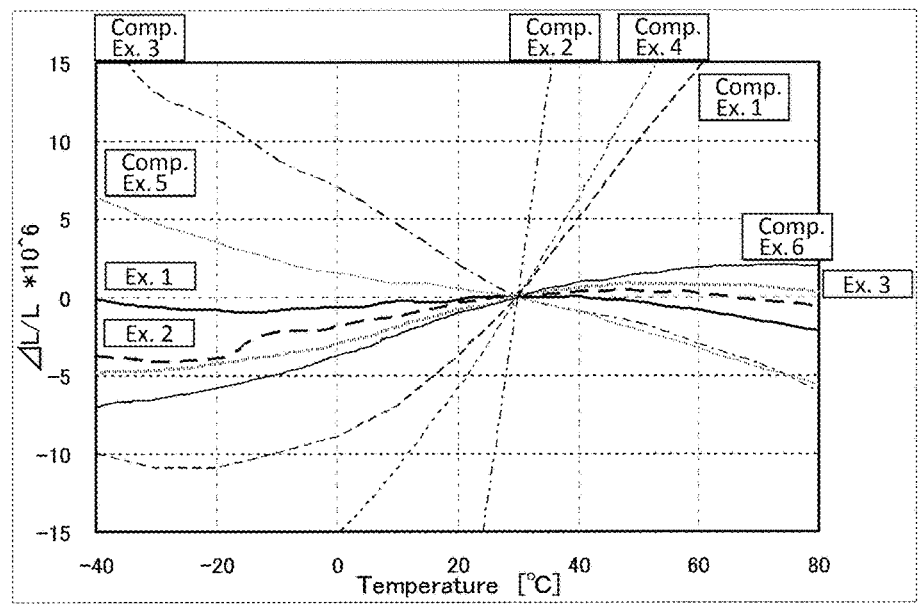
FIG. 2 is a graph showing $\Delta L/L$ in Examples and Comparative Examples.

Next, ΔL/L values of the obtained crystallized glass plate at −40° C. to 80° C. were measured. The result is shown in FIG. 2.

Example 2

A crystallized glass plate was produced in the same manner as in Example 1 except that the maximum temperature in the crystallization step was 930° C., and ΔL/L values of the obtained crystallized glass plate at −40° C. to 80° C. were measured. The result is shown in FIG. 2.

Example 3

A crystallized glass plate was produced in the same manner as in Example 1 except that the maximum temperature in the crystallization step was 935° C., and ΔL/L values of the obtained crystallized glass plate at −40° C. to 80° C. were measured. The result is shown in FIG. 2.

Comparative Example 1

A quartz glass plate was prepared as Comparative Example 1 and ΔL/L values thereof at −40° C. to 80° C. were measured. The result is shown in FIG. 2.

Comparative Example 2

A silicon plate was prepared as Comparative Example 2 and ΔL/L values thereof at −40° C. to 80° C. were measured. The result is shown in FIG. 2.

Comparative Example 3

A crystallized glass plate containing β-quartz solid solution only as a predominant crystal phase (Neoceram N-0 manufactured by Nippon Electric Glass Co., Ltd.) was prepared and ΔL/L values thereof at −40° C. to 80° C. were measured. The result is shown in FIG. 2.

Comparative Example 4

A crystallized glass plate containing β-spodumene solid solution only as a predominant crystal phase (Neoceram N-11 manufactured by Nippon Electric Glass Co., Ltd.) was prepared and ΔL/L values thereof at −40° C. to 80° C. were measured. The result is shown in FIG. 2.

Comparative Example 5

A crystallized glass plate was produced in the same manner as in Example 1 except that the maximum temperature in the crystallization step was 910° C., and ΔL/L values of the obtained crystallized glass plate at −40° C. to 80° C. were measured. The result is shown in FIG. 2.

Comparative Example 6

A crystallized glass plate was produced in the same manner as in Example 1 except that the maximum temperature in the crystallization step was 940° C., and ΔL/L values of the obtained crystallized glass plate at −40° C. to 80° C. were measured. The result is shown in FIG. 2.

Furthermore, for the crystallized glass plates obtained in Examples 1 to 3 and Comparative Examples 5 and 6, $(\Delta L_{max}-\Delta L_{min})/L$ in the range of −40° C. to 80° C. was calculated. The results are shown in FIG. 3.

Figure 3:
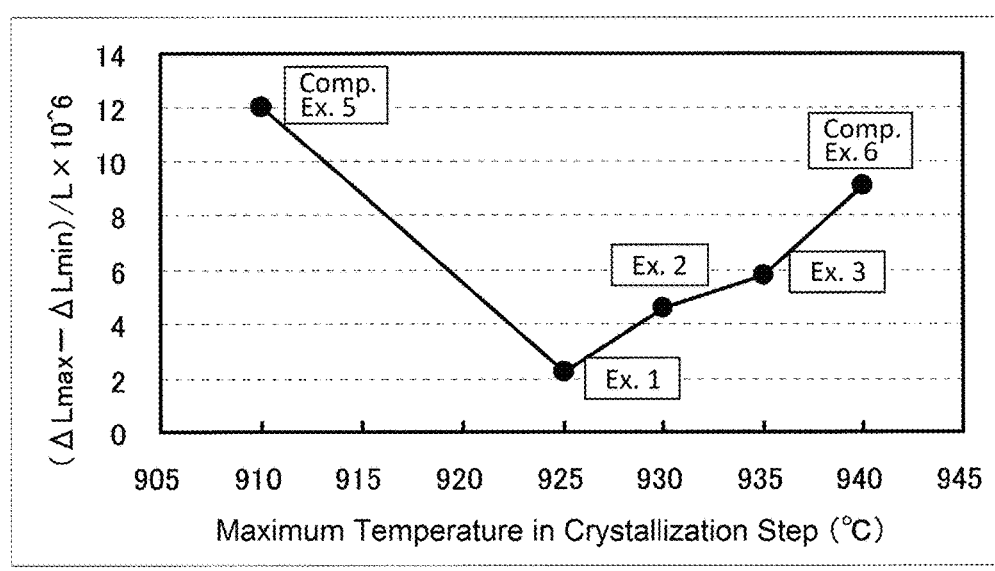
FIG. 3 is a graph showing the relationship between the maximum temperature in a crystallization step and the value $(\Delta L_{max} - \Delta L_{min})/L$ obtained by dividing the difference between the maximum value $\Delta L_{max}$ and the minimum value $\Delta L_{min}$ of $\Delta L$ of an obtained crystallized glass plate in a range of $-40°$ C. to $80°$ C. by L.

The results shown in FIGS. 2 and 3 reveal that in Examples 1 to 3 $(\Delta L_{max}-\Delta L_{min})/L$ in the range of −40° C. to 80° C. is as small as $6\times10^{-6}$ or less and their local maximum points and local minimum points of ΔL/L exist in the range of −40° C. to 80° C. Furthermore, it can be seen that by changing the maximum temperature in the crystallization step, $(\Delta L_{max}-\Delta L_{min})/L$ in the range of −40° C. to 80° C. can be changed.

INDUSTRIAL APPLICABILITY

The crystallized glass of the present invention is not limited to application to a substrate of an optical wavelength multiplexer/demultiplexer but can also be used, for example, as a spacer of an air-gap etalon, members for precision scales, such as a linear encoder position scale, structural members of precision equipment, and a base material for a precision mirror.

REFERENCE SIGNS LIST

1 . . . crystallized glass

The invention claimed is:
1. A crystallized glass comprising:
a composition, in % by mass, including 55 to 75% $SiO_2$, 20.5 to 27% $Al_2O_3$, greater than 2 to 4.5% $Li_2O$, 1.5 to 3% $TiO_2$, 0.1 to 0.5% $SnO_2$, 3.8 to 5% $(TiO_2+ZrO_2)$, 3.7 to 4.5% $(Li_2O+0.741\ MgO+0.367ZnO)$, and up to 0.5% $(SrO+1.847CaO)$; and
both β-quartz solid solution and β-spodumene solid solution as predominate crystal phases, wherein
a value $(\Delta L_{max}-\Delta L_{min})/L$ obtained by dividing a difference between a maximum value $\Delta L_{max}$ and a minimum value $\Delta L_{min}$ of ΔL in a range of −40° C. to 80° C. by L is $8\times10^{-6}$ or less where L represents a length of the crystallized glass at 30° C. and ΔL represents a difference between a length $(L_t)$ of the crystallized glass at each of the temperatures and the length (L) thereof at 30° C.
2. The crystallized glass according to claim 1, wherein a local maximum point and a local minimum point of ΔL/L exist in the range of −40° C. to 80° C.
3. A method for manufacturing the crystallized glass according to claim 1, the method comprising the steps of:
preparing a crystallizable glass; and
crystallizing the crystallizable glass to obtain the crystallized glass,
wherein a maximum temperature in the crystallization step is a temperature according to a thermal expansion characteristic of the crystallized glass to be obtained.
4. The method for manufacturing the crystallized glass according to claim 3, wherein the maximum temperature in the crystallization step is set so that a value $(\Delta L_{max}-\Delta L_{min})/L$ obtained by dividing a difference between a maximum value $\Delta L_{max}$ and a minimum value $\Delta L_{min}$ of ΔL in a range of −40° C. to 80° C. by L is $8\times10^{-6}$ or less where L represents a length of the crystallized glass at 30° C. and ΔL represents a difference between a length $(L_t)$ of the crystallized glass at each of the temperatures and the length (L) thereof at 30° C.

* * * * *